Nov. 22, 1927.
A. J. NELSON
1,650,149
HUMIDITY CONTROL SYSTEM
Filed Dec. 15, 1924
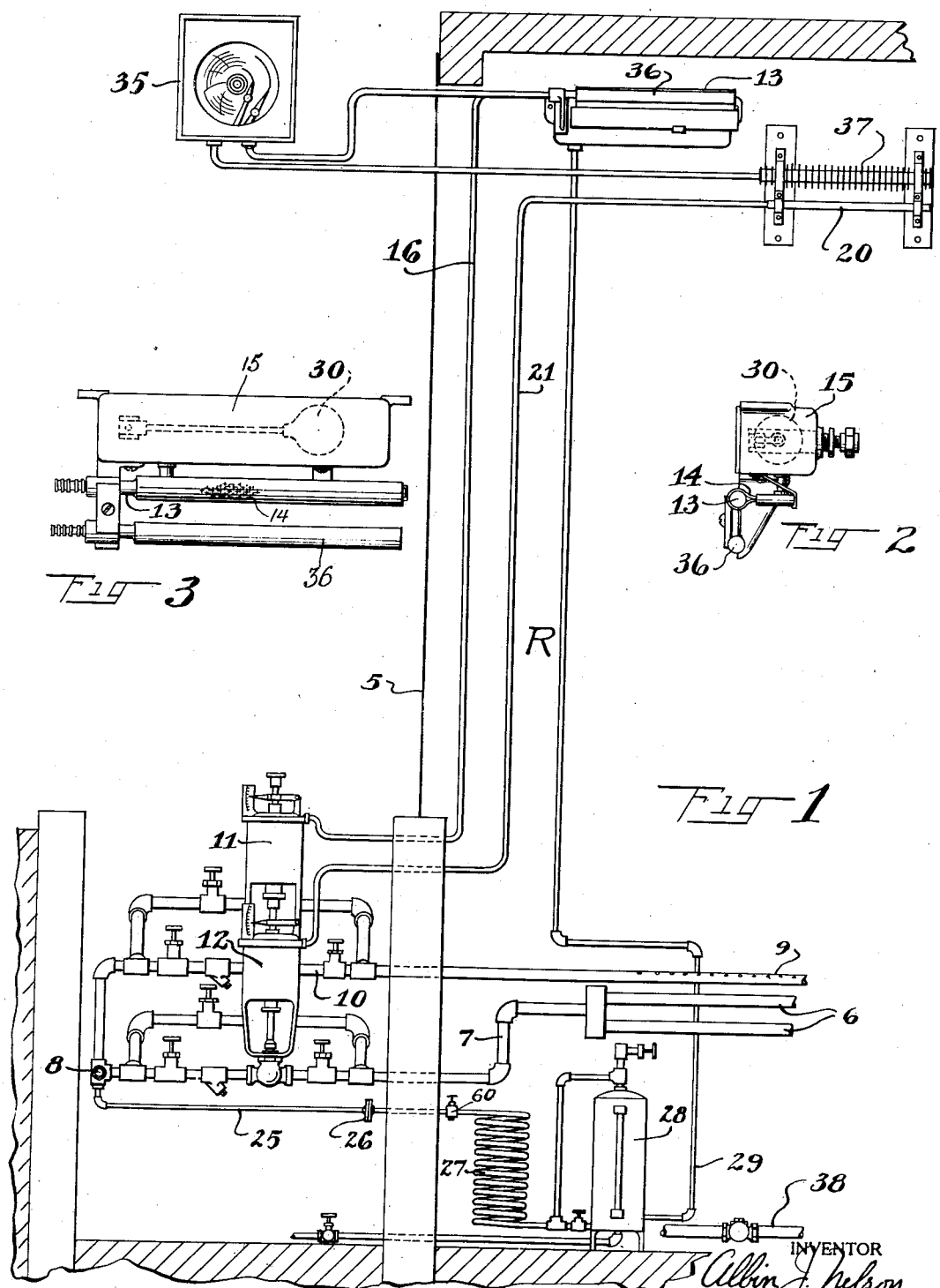

Patented Nov. 22, 1927.

1,650,149

UNITED STATES PATENT OFFICE.

ALBIN J. NELSON, OF BROOKLYN, NEW YORK, ASSIGNOR TO AMERICAN SCHAEFFER AND BUDENBERG CORPORATION, A CORPORATION OF NEW YORK.

HUMIDITY-CONTROL SYSTEM.

Application filed December 15, 1924. Serial No. 756,166.

This invention relates to temperature and humidity control systems and particularly to such systems for dry rooms.

The object of the invention is to provide a control system which will be accurate and reliable and which will automatically maintain the desired conditions over a long period without special attention, replacement or readjustment.

A further object of the invention is to provide a control system which will maintain all year operation in connection with dry rooms or kilns installed out in the open.

A further object of the invention is to provide a system which will utilize the steam heating or humidity supply to supply water to the control parts.

In the accompanying drawings illustrating the invention.

Fig. 1 is a diagrammatic elevational view of the system installed in connection with a dry room.

Fig. 2 is an end view on enlarged scale of a detail shown in Fig. 1, and

Fig. 3 is a plan view of Fig. 2.

In the specific embodiment of the invention shown in the drawings a drying room R having an outer wall 5 is heated by steam coils 6 through piping 7 from a main steam supply 8, these coils 6 acting to regulate the temperature of the interior of the dry room R. To control the humidity of the dry room a steam spray 9 is provided fed through piping 10 leading from the main steam supply 8 and both the heating coil and the steam spray supplies are automatically controlled by a regulating system having the humidity temperature controller 11 and the dry heat temperature controller 12 connected to respond to variations in humidity and temperature within the dry room.

A wet bulb 13 is supported within a characteristic intermediate portion of the dry room and has its temperature controlled by a wick 14 continuously supplied with water from the automatic water flow box 15. The bulb 13 is connected to the controller 11 by a fluid column in the tube 16, the controlling pressure exerted by this fluid column in the controller 11 being varied according to the temperature of the wick 14.

The controlling dry bulb 20 is also mounted in the dry room adjacent the wet bulb 13 and this dry bulb 20 is connected to the dry heat temperature controller by a fluid column in the tube 21. The evaporation of the water around the wet bulb 13 lowers the temperature of said bulb while the dry bulb 20 is substantially the temperature of the intermediate portion of the dry room. The differential temperature effect between the wet bulb and the dry bulb determines the percentage of humidity there is in the dry room and when this humidity is too low a supply line 10 is opened by the controller 11 in accordance with said differential temperature effect to spray steam into the dry room until the proper degree of humidity is reached reducing the difference in temperature between the bulb 13 and bulb 20 which in turn closes the valve of the spray supply line 10. The steam supply to the steam coil 6 is controlled by the dry heat temperature controller 12 operating the valve in the supply line 7 according to variations in temperature at the bulb 20.

To accurately control the conditions within the dry room it is important to have the characteristic conditions at the wet bulb 13 as constant as possible with relation to the dry bulb 20 so that the only differential temperature effect at the wet bulb 13 is that of the increased evaporation due to a decrease in humidity. A pronounced change in the temperature of the water supplied to the bulb 13 or any accumulation of impurities interrupting the supply of water will undesirably affect the operation of the wet bulb so that its temperature will no longer be in true differential relation to the reading of the bulb 20. The water supply to the bulb 13 is, therefore maintained very close to the temperature of the dry room and the water itself is of the utmost purity. The water supply for this wet bulb 13 is drawn from the main steam supply 8 through the outside pipe 25 which may be wrapped or jacketed in any desired manner to protect it against condensation or freezing if necessary. A steam strainer 26 connects the pipe 25 to the pipe of a condensing coil 27 placed in the lower portion of the dry room R. This condensing coil is at the temperature of the lower portion of the dry room which may be 10 or 15° below the temperature of the dry room at the bulbs 13 and 20. In this condensing coil 27 the steam from the pipe 25 is condensed and passed on to the copper tank 28 of about any desired capacity. From this tank the pipe 29 leads the water to the continuous automatic water flow box 15 wherein the float 30 and its valve maintain a constant level of water so as to supply the water evenly to the wick wetting the bulb 13. The main steam supply 8 may for instance be at a pressure of about one hundred fifty pounds per square inch and substantially this pressure will be reduced by reducing valve 60 to suit the elevation of the water box.

A recording hygrometer is shown at 35 connected to the recording wet bulb 36 and the recording dry bulb 37, the readings showing the differential effect of said bulbs. 38 is the return line for the heat supply to the room R.

As the water in the flow box 15 is evaporated or taken up by the wick 14 a fresh supply of water is passed to the flow box by the valve, this water being distilled in the boiler supplying the main 8 and strained again at strainer 26 before entering the condenser 27 and reservoir 28. This supply of water is therefore absolutely pure and free from any sediments, such as lime, magnesia or iron, to accumulate in the flow box or on the wick 14 or bulb 13. The system will therefore remain indefinitely in operation without attention or replacement or cleaning as there is nothing to interfere with its continuous accurate operation.

This water supply is also at a substantially constant temperature as the water is used only comparatively slowly and is maintained a long time in the condenser and reservoir and pipe 29 during which time it comes to substantially the temperature of the dry room as maintained by the heating coils. This constant temperature of the water supply to the wick 14 is important in avoiding variations in the temperature of the bulb 13 due to an extraneous source such as the supply of cold water from an outside source at a temperature different from that of the dry room.

Where the dry room or kiln is located out of doors, as is usually the case, the water of constant temperature supplied to the wick 14 is not interfered with because the steam condensing in the condenser 27 within the dry room is unaffected by the outside temperature and there is no possibility of the water supply line freezing no matter how low the outside temperature may become.

I claim:—

1. In a humidity control system the combination with an enclosure, of a moisture supply therefor comprising a steam supply line and wet bulb hygrometer means for controlling the flow of steam from said steam supply to said enclosure in accordance with the humidity of said enclosure, and a water supply for said wet bulb hygrometer means comprising condensing means connected to receive steam from said supply to said control and cooling said steam to a liquid state at substantially the temperature of said enclosure.

2. In a humidity control system the combination with an enclosure, of a moisture supply therefor comprising a steam supply line from outside of said enclosure, and hygrometer means for controlling the flow of steam from said line to said enclosure in accordance with the humidity thereof and including a wet bulb having a water reservoir, a water supply for said wet bulb reservoir comprising condensing means within the enclosure adapted to receive steam from said supply line and condense it and supply it to said reservoir at substantially the temperature of said enclosure.

ALBIN J. NELSON.